Feb. 19, 1963 P. H. TIMOTHY 3,078,324
PIPE COATING COMPOSITION COMPRISING ASPHALT AND
A FILLER GRADED TO MAXIMUM DENSITY
Filed Feb. 21, 1957
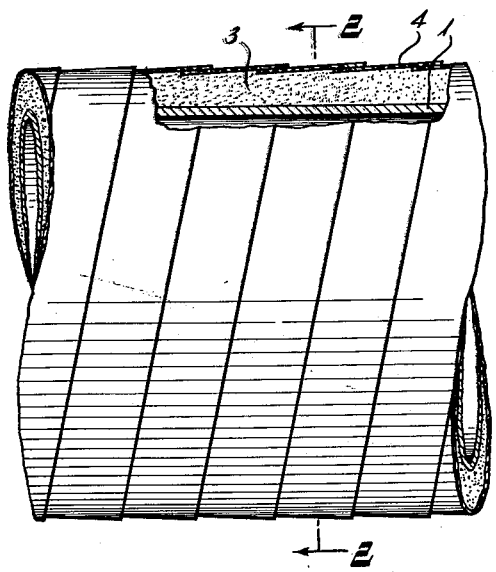
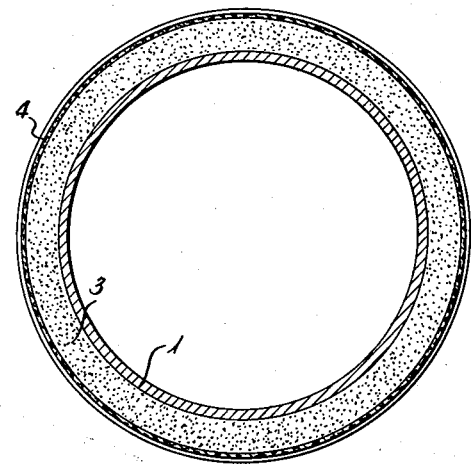
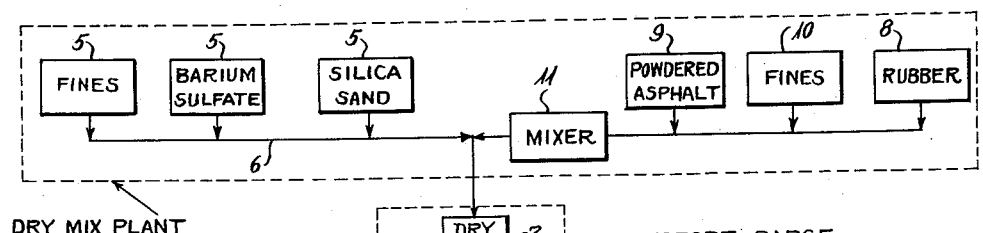
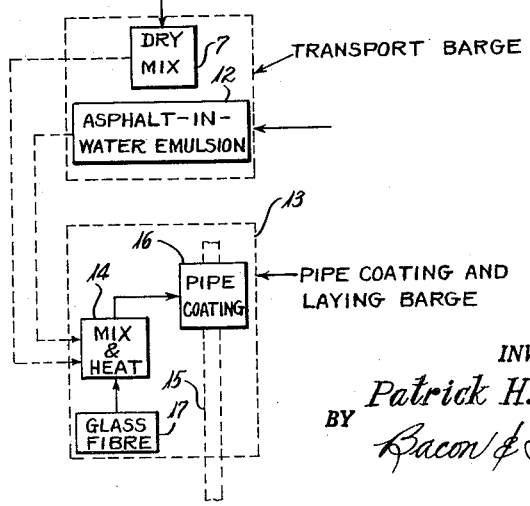
INVENTOR.
Patrick H. Timothy
BY Bacon & Thomas
ATTORNEYS United States Patent Office 3,078,324
Patented Feb. 19, 1963

3,078,324
PIPE COATING COMPOSITION COMPRISING ASPHALT AND A FILLER GRADED TO MAXIMUM DENSITY
Patrick H. Timothy, New Orleans, La., assignor to Southern Natural Gas Company, Birmingham, Ala., a corporation of Delaware
Filed Feb. 21, 1957, Ser. No. 641,619
6 Claims. (Cl. 260—758)

This application is a continuation-in-part of the application of Patrick H. Timothy, Serial No. 491,834, filed March 3, 1955, for "Pipe Coating Composition and Coated Pipe."

The present invention relates to a pipe coating composition, to a pipe coated therewith, and a method of making the composition. More particularly, it relates to a coating composition and coated pipe in which the coating composition comprises a bituminous mastic including mineral aggregates of varying weights depending largely on the size of the pipe.

Underwater steel pipe lines are in extensive use today for transporting petroleum oil and natural gas. Exclusive of gathering lines, which merely transport oil and gas from the individual wells to a central collection point, the steel pipes used generally range in size from an outside diameter of about 8 5/8 inches to as large as 36 inches. The thickness of the walls of these pipes generally vary from 1/4 inch for the smaller diameter pipes to 1/2 inch for those of large diameter.

There are two very serious problems encountered in the use of the steel pipes just described. The first of these is the corrosive action of the waters, especially saline waters, in which the pipe is laid, and the other is the necessity for weighting the pipes caused by the fact that pipes of 8 5/8 inches and over in diameter are quite buoyant. They must be weighted to cause them to sink and remain stable against wave action and underwater currents. The weighting problem is especially aggravated by the buoying effect of the colloidal materials in suspension at or near the bottom of recently excavated pipe line canals or when depths are adequate for the laying equipment and the lines are laid directly on bottom and subsequently buried below bottom by jetting.

Various types of bituminous coatings have been found in general to afford the best protection against corrosion and these coatings have ranged from a thin enamel-like coal-tar coating to a relatively thick asphalt mastic consisting of a plastic mixture of asphalt and fine aggregate in which the aggregate predominates. However, regardless of pipe size, these coatings do not exceed 5/8 inch in thickness, and as these thin coatings are very susceptible to attack by various marine organisms, particularly barnacles, the coatings will be penetrated in time when laid in salt or brackish waters in which barnacles are found. When the coating is penetrated, the highly corrosive water has access to the pipe to bring about its destructive action.

Pipe lines of diameters up to and including 6 5/8 inches are, in general, sufficiently heavy due to the weight of the steel that they can be laid in water without a weight coating. However, none of the corrosion protective coatings of the prior art have been sufficiently heavy to sink and stabilize a steel pipe line of diameters larger than 6 5/8 inches with the possible exception of the heavy wall pipes of 8 5/8 inches in diameter which is the next larger size. It has been the practice to first apply an asphaltic or coal-tar corrosion protection coating and over this a concrete coating of sufficient thickness that the resulting coated pipe was heavy enough to sink and stay in place in the water in which it was laid. Concrete coatings require at least seven days to become sufficiently cured so that the pipe can be handled and laid in the field. A central coating yard is, therefore, required where the concrete can be applied to the pipe and properly cured before the pipe is transported to the field. At the curing yard the bare pipe must be unloaded, stored, cleaned, primed, coated and wrapped with an anti-corrosion coating before the concrete can be applied. The ends of the pipe joint are, of course, left uncoated for a sufficient length to permit welding together at the laying site and after welding the bare sections on the line must be hand-coated, which represents a considerable loss in time and money.

After overcoating with concrete, the pipe must be cured, stored and finally loaded and transported out of the yard. The heavily coated concrete pipe is generally loaded on barges and transported over available water routes to the nearest location to the job where transfer is made to smaller barges which can navigate the narrow pipe line canals. From the latter barges the heavy joints are either strung along the canal banks or transferred to the lay barge where they are finally picked up and welded into the line.

Large coating yards are expensive and require elaborate installations generally consisting of hard-surfaced storage areas, three to four railroad spurs, flat cars for transporting pipe, locomotive cranes and prime movers. Altogether about seven handlings of the pipe are required to apply the anticorrosion coatings in the coating yard and after the pipe is coated with concrete eleven handlings of the heavily weighted joints are then required before the pipe is finally laid. For example, a 20-inch outside diameter gas transmission line laid across Lake Pontchartrain near New Orleans, Louisiana, during the summer of 1953 weighed 72 lbs. per lineal foot uncoated and 313 lbs. per lineal foot when coated with concrete. Each joint weighing 2,880 lbs. had to be handled seven times by crane and moved on railroad cars before the concrete was applied and thereafter each coated joint weighing 12,520 lbs. had to be handled eleven times and moved by railroad car or barge before laying.

Also, the concrete coatings of the prior art require expensive steel mesh reinforcement at their center to hold them on the pipe, since there is little or no bond between the concrete and the underneath asphalt or coal-tar anticorrosion coating which has an outerwrap of kraft paper or felt.

Even so reinforced, the concrete coating is so brittle that it is easily cracked during the pipe-laying operation. For example, while a 12 3/4 inch pipeline can readily be bent within the elastic limit of the steel to a curvature having a radius of about 325 feet, such a pipe when coated with concrete cannot have a radius of curvature less than about 1,600 feet without there being serious cracking of the coating. There are many other ways in which the concrete coating may become cracked, such as by contact with hard objects during the laying operation and since, as pointed out above, little or no bond exists between the concrete coating and the paper or felt wrapped anti-corrosion coating, a cracked concrete coating is very likely to become loosened and fall away from the pipe as the thin wire reinforcing mesh at the center of the coating is soon destroyed by the corrosive action of the water entering through the cracks. The cracking of the concrete will thus ultimately expose the lower corrosion protection layer to the action of various marine organisms which will in time penetrate this thin layer and result in failure of the pipeline due to corrosion. It is an extremely time-consuming, difficult, and expensive operation to undertake repairs to a pipeline on or below the bottom of a pipeline canal and especially below the bottom of the ocean.

By the present invention, I have provided an anti-corrosion and weight coating which can be applied in one application directly to the pipe after welding and immediately before the pipe enters the water, thus eliminating the necessity for a coating yard and the many costly handlings of the heavily coated pipe required when concrete is used. The ability to apply a continuous coating in the field also eliminates the necessity of hand-coating the gaps which exist at the welds of yard-coated pipe, as previously mentioned.

The coating composition of this invention may weigh over 230 lbs. per cubic foot, whereas a concrete coating having the same heavy weight aggregate, which will be described in detail hereinafter, weighs only 190 lbs. per cubic foot. Hence, in a liquid weighing 78 lbs. per cubic foot (S.G. = 1.25), the negative buoyancy of a heavy coating of this invention is 230 − 78 = 152 lbs. per cubic foot, whereas the negative buoyancy of the concrete is 190 − 78 = 112 lbs. per cubic foot. In the above liquid the coating of this invention is $$\frac{152}{112} = 1.36$$

times as effective per cubic foot as concrete. In other words, 36% more heavy aggregate concrete is required by volume to give the same negative buoyancy. Accordingly, 1.36 × 190 = 258 lbs. of the concrete coating is required to give the same negative buoyancy as 230 lbs. of the coating of this invention. Since the purpose of a weight coating is to provide negative buoyancy, weight coatings must be evaluated by their relative cost to provide the same negative buoyancy or by their cost per pound of negative buoyancy. In comparing the cost of coating materials for concrete with the cost of the materials of the coating of this invention, the concrete material costs must include the reinforcing steel together with the priming and coating materials required to give the necessary protection from corrosion. For the various sizes of pipelines, the cost of materials alone per pound of negative buoyancy for the coatings of this invention average 35% less than the material costs for the concrete coatings. Furthermore, significant savings in equipment and labor result in applying the coating of this invention in a single operation as compared with the concrete anti-corrosion coatings which require four distinct operations to prime, to apply the corrosion protection, to apply the concrete and to cure. These savings are in addition to the costs of the coating yard, the handling and transporting the heavily weighted joints and the coating by hand methods of the welded ends in the field as outlined above.

The coating composition of this invention is very flexible, tough and strong and will withstand the deflections, shocks and abrasions ordinarily encountered in the construction and operation of pipelines. It has superior electrical insulating properties which assure a corrosion protection of indefinite duration. Unlike concrete, which requires a costly steel reinforcement to keep it on the pipe, the coating of this invention utilizes the pipe itself as its steel reinforcement by means of its firm bond to the pipe wall.

While the adaptability of the present pipe coating composition to field application has been stressed, it is to be understood that it readily lends itself to a yard-coating operation as well. Regardless of the point of application, it is apparent that great savings in cost of materials, equipment and labor will be realized. While the present invention is of special utility in providing a weight coating for underwater pipelines, it also has superior ability to protect pipes from rocks or the like when laid in dry ditches on land.

Accordingly, it is a primary object of the present invention to provide a pipe coating composition which can be applied by a single coating operation, and which will afford both adequate protection of the pipe against corrosion and weighting of the pipe so that it will sink in the water in which it is being laid and will remain stable on the bottom.

Another object of the invention is to provide a pipe coating composition which will effect weighting and corrosion protection of a steel pipeline at an extremely low relative cost.

Another object of the invention is to provide a coating composition for steel pipes which will adhere very strongly to the surface of the pipe over long periods of use and under abusive conditions.

A further object of the invention is to provide a pipe coating composition which will have superior waterproofing and electrical insulating properties.

Still another object of the invention is to provide a pipe coating composition which can be applied to a pipe in the field and the pipe thereafter laid under water almost immediately without delays for curing the coating.

Another object is to provide a weight coating that needs no internal steel reinforcement.

A still further object of the invention is to provide a heavyweight coating and coated pipe which can be laid in wave-disturbed waters to depths in excess of 12 to 18 feet without damage to the coating.

A still further object of the invention is to provide a pipe coating composition which is flexible to the extent that a pipe coated therewith can be bent up to and beyond its elastic limit without rupturing the coating and has the toughness and strength to withstand the deflections, shocks, and abrasions ordinarily encountered in the construction and operation of steel pipelines.

Another and further object of the invention is to provide a pipe coating composition, which can be applied to a continuous length of the pipe after it is welded together on a barge from which the pipe is being laid, thus eliminating the necessity for a central coating yard and the attendant costly handling of the heavily weighted pipe joints and hand-coating of the gaps at the ends of the joints.

Another and further object of the invention is to provide a coated steel pipe which will remain stable on the bottom of a body of water, and which will not be subject to penetration by marine organisms and thereby expose the pipe to corrosion by the water in which it is laid.

Still further objects and advantages of the invention will be apparent from the following detailed description taken in conjunction with the drawings, in which:

FIG. 1 is a fragmentary elevational view of a length of coated pipe with a portion removed to better illustrate the invention;

FIG. 2 is a sectional view taken on the line 2—2 of FIG. 1 looking in the direction of the arrows; and FIG. 3 is a flow diagram illustrating a preferred method of mixing and handling the composition.

The bituminous mastic coating composition of the present invention may be compound to weigh approximately 100 lbs. per cubic foot more than the ordinary bituminous mixtures which have been heretofore developed for coating steel pipes. In general, the coating composition of this invention may weigh in excess of 230 lbs. per cubic foot.

To achieve this very high density, a non-micaceous heavyweight mineral aggregate graded to produce maximum density is employed. The preferred aggregate is barium sulfate, and a barium sulfate ore, which is readily available in this country and in Canada, has proved very satisfactory. Another heavyweight aggregate which may be used, however, is ilmenite, a titanium ore which is also readily available in large quantities.

It has been found that a suitable combination of coarse and fine aggregates is obtained by a grinding of the barium sulfate or ilmenite ore to pass a 6-mesh screen and first increasing the amount of fines by adding the necessary amount of barium sulfate ground to less than 200-mesh size to provide a mixture of maximum density so that a minimum amount of binder will be required to fill the voids, and then by increasing the fines and binder of this theoretical mixture in such manner as to provide the necessary fluidity to permit the mixture to be extruded about the pipe and firmly bonded thereto with little or no resulting loss in density. An aggregate ground to pass a 4-mesh screen has also been found satisfactory in most cases, resulting in a substantial saving in cost. Barium sulfate is commercially available ground to less than 200-mesh size for use as a drilling mud, and it has been found convenient to use this material as the added fines whether the aggregate is composed principally of barium sulfate or ilmenite. Since the optimum thickness and corresponding density of the coatings of this invention vary with the size of the pipe, as will be fully described, the heavyweight coating materials must be blended with increasing proportions of lighter weight materials as the diameter of the pipe decreases. The preferred lightweight materials are silica sand aggregates and fines consisting of powdered limestone.

A typical United States standard sieve analysis of a Canadian barium sulfate ore ground to pass a 6-mesh screen gives the following proportions:

| Screen size | Percent passing | Percent retained |
| --- | --- | --- |
| 4 mesh | 100.0 | 0.0 |
| 8 mesh | 90.5 | 9.5 |
| 10 mesh | 82.3 | 8.2 |
| 40 mesh | 33.0 | 49.3 |
| 80 mesh | 22.5 | 10.5 |
| 200 mesh | 15.6 | 6.9 |
| Less than 200 mesh | | 15.6 |
| Total aggregate | | 100.0 |

When ground to pass a 4-mesh screen, the material contains a small proportion of particles that pass the 4-mesh screen, but would be retained on a 6-mesh screen. A filler of ore drilling mud may then be added to the above mixture until approximately 24.7% of the total aggregate passes the 200-mesh screen. Depending upon the method of grinding used by the particular manufacturer, the barium sulfate aggregates require blending with barium sulfate drilling mud until 21.6 to 27.6% of the total weight passes the 200-mesh screen, to obtain an extrudable mixture of maximum density. The barium sulfate drilling muds used for this purpose are those ground so that more than 99% pass the 200-mesh screen and 92 to 95% pass the 325-mesh screen. When ilmenite ground so as to pass the 6-mesh screen is used as a heavyweight aggregate in forming the course aggregate of the coating composition of the present invention, it has been found that the required weight of finely ground barium sulfate filler, which must be added to produce the maximum density suitable for extruding, is usually in the neighborhood of 10 to 20% of the total weight of the combined aggregates.

A bituminous material is used as the binder for the present coating composition. Preferably the bituminous material is principally asphalt since a wide latitude in selection is possible to obtain the type best suited for the conditions under which the coated pipe is to be used. The asphalts used for the coatings of the invention are preferably steam-reduced asphalts especially refined from selected crudes so that the salt content is reduced to 50 lbs. or less per thousand barrels and may vary from a 20–30 penetration asphalt having a softening point of about 170° F. to a 60–70 penetration asphalt having a softening point of about 135° F. Reference herein to the penetration numbers of asphalt refers to the standard method of indicating asphalt hardness and is based on the distance of penetration of a member into the asphalt at a fixed temperature and under a predetermined force in a given period of time. The penetration numbers are standard in the trade and are fully outlined in the Manual of the American Society of Testing Materials. Lines laid where hard objects will be contacted, as when laid in and back-filled with rock, should contain coatings with lower penetration asphalts to increase the resistivity of the coating to concentrated stresses brought about by contact with those objects. Also, when lines are laid by land methods or whenever the joints are yard-coated and require handling, shipping and storing, preference should be given to lower penetration asphalts. On the other hand, when the pipe joints are to be continuously coated after welding at the site of operations and laid immediately thereafter under water, a higher penetration, lower melting point asphalt should be chosen for the attendant advantage of being workable at lower temperatures.

A mixture having the required fluidity at extrusion temperatures is necessarily quite soft and will creep or flow about the horizontal pipe immediately after it is applied thereto. It has been found that the coating mixture can be adequately stabilized to prevent distortion or sagging at extrusion temperatures without affecting its extrudability by including a minor proportion of fibrous material, preferably mineral fibers, in the composition. Glass fibers having a length of about ¼ inch are short enough to permit ready extrusion and yet sufficiently sustaining to hold the shape and position of the hot mixture on the pipe. The stability and toughness of the present bituminous mastic is also greatly improved in the cold state by the internal reinforcement provided by the fibrous material.

The preferred source of the glass fibers is a glass fiber yarn readily available in commerce and composed of about 208 individual filaments coated with a suitable sizing to permit filamentation and dispersion within the hot mixture. This glass yarn is readily chopped into approximately ¼-inch lengths.

Theoretically the ideal proportions of different sized aggregate particles would be that in which the largest aggregate particles are present in sufficient amount to fill the desired space and each succeeding smaller sized particle is present in sufficient quantity to fill the voids between the next larger sized particles until all voids are filled, with the exception of those between the smallest particles, that is, those particles passing a 200-mesh screen. A graded aggregate satisfying those conditions is referred to as an aggregate "graded to maximum density." If asphalt is present in sufficient quantities to just fill the voids between the finest particles, there will then be no voids present in the mass and the mass would be of maximum possible density. However, a coating composition of such character is unsuitable for the present purpose since it would be extremely stiff and difficult to handle. In fact, it would be impossible to extrude as a uniform coating on pipe by any known extruding apparatus. Even when the asphalt is hot, such a mixture would be too stiff to flow readily, because of the direct contact between the larger particles. Such a mixture could be rendered extrudable by increasing the amount of asphalt very substantially so that there is a large excess of asphalt present but it would be too fluid to enable the mineral fibers to retain the shape of the coating material after it is extruded about the pipe. Furthermore, it would be necessary to add so much asphalt, which has a specific gravity of approximately 1, that the density of the coating would be appreciably reduced, requiring an undue thickness to attain the desired weight characteristics and the cold stability or its load-bearing properties would also be adversely affected. Applicant has discovered that an aggregate "graded to maximum density" as described above, may be rendered extrudable without appreciable loss of density by adding thereto additional fines over and above the fines necessary to fill the voids in the primary aggregate mass together with a sufficiently increased amount of asphalt to slightly exceed the amount required to fill the voids between all the fines present. A mixture is thus produced that has substantially the same density as the theoretical mixture but which is readily extrudable and which has adequate hot as well as cold stability. Before such a mixture could be derived, however, it was necessary for the applicant to develop an apparatus for determining the extrudability of a mixture in the laboratory in order to save the time and labor that would be involved in attempting to test each variation in the mixture by actually applying it to the pipe in the coating machine. Furthermore, it was necessary to develop an operating procedure for rapidly obtaining the desired composition that could be applied not only to the three basic mixes hereinafter discussed but to mixtures of other types or gradations of aggregates and fines as required. The procedure is as follows:

(1) The first trial mixture is one in which the weight of the fines is 25% of the combined weight of the aggregates and fines. This represents an increase in the fines from ⅓ to ⅔ of the amount required to give the theoretical maximum density. When fines of different specific gravity occur in the same mix, equivalent weights must be derived from the ratio of their bulk densities. A 20–30 penetration asphalt is then added until optimum extrudability at 350° F. is obtained. A sample of this mixture is then compacted at 350° F. by the Marshall method and its density determined at 77° F.

(2) A second trial mixture is then made in which the fines in the first trial mixture are increased about 2% and the above procedure is repeated. If a mixture of greater density is obtained than that of the first trial mixture, a further increase in fines is made and the process again repeated until the extrudable mixture of maximum density is obtained.

(3) If the second trial mixture is found to have a density less than that of the first trial mixture, a mixture is made in which the fines are about 2% less than the amount used in the first trial mixture and the process repeated until the desired mixture is obtained.

(4) After completing the laboratory work, the mixture is applied to the pipe in the coating machine where further adjustments are made, if necessary.

The present invention contemplates the use of asphalt as a binder, and that asphalt may be provided in the mix in any desired or convenient form. Since underwater pipelines are laid in open waters or in marsh or swamp from floating equipment whenever feasible, great savings, as previously emphasized, can be made by the use of the coating of this invention since it can be applied directly on the lay barge, thereby eliminating the costly coating yard required for concrete together with the cost of handling and transporting the heavily weighted joints. In order to apply the present coating on the floating plant used to lay the line in the ocean or in pipeline canals, it is necessary to either mix and heat the various ingredients of the mixture on the floating equipment or to mix and heat the ingredients ashore and then transport the hot mixture in insulated and heat-jacketed containers to the floating plant. Investigations of the many difficult and costly problems involved in transporting ordinary asphalt in bulk and employing standard methods and equipment for hot mixing ordinary asphalt mixtures on barges at sea or in inland waterways proved that it is not practical to heat and mix mixtures containing ordinary asphalt on the floating plant. Furthermore, sufficient space is not available on the narrow barges used in pipeline canals to permit installation of the metering equipment for the fines and aggregates, the dryers, dust collectors, and other bulky structures required for conventional asphalt mixtures. Studies were then made of the feasibility of mixing and heating ashore and transporting the hot mixed coating material to the lay barge. This plan was also abandoned due to the high cost of providing insulated and heat-jacketed hoppers and conveying equipment as such containers would have to maintain the proper temperature of the coating mixture until it is actually extruded on the pipe, regardless of delays due to weather or other causes.

To obviate the above-noted disadvantages applicant has found that the above coating composition may be conveniently prepared by first mixing the dry ingredients and transporting them to the location at which the pipe is to be coated, then mixing therewith an asphalt-in-water emulsion in the required quantities. The mixture may then be heated to evaporate the water and soften the asphalt to liquid consistency right at the locale of the coating apparatus without the necessity of providing insulated and heat-jacketed containers for transportation of the material. The ease with which the asphalt emulsion may be transported and handled together with the relatively simple methods and compact equipment available for mixing and heating render the use of such emulsified asphalt highly advantageous and economical. The emulsified asphalt is a known and readily available commercial product.

The emulsified asphalt used in the coating of this invention is especially prepared for underwater mixtures and best results are obtained by emulsification of a soft or high penetration asphalt. Although the emulsified asphalt has a penetration of about ten points lower than the 60–70 penetration base asphalt from which it is prepared, the resultant mixture does not possess adequate stability for pipe line coating. It is too soft and too susceptible to distortion or displacement by handling or loads that may be imposed on the coated pipe. Applicant has found that this disadvantage can be readily overcome by adding a small quantity of dry pulverized hard asphalt having a penetration of from zero to 3. Preferably the powdered asphalt is mixed with the dry aggregate mix, while in the dry state, and transported to the pipe coating site, mixed with the aggregate material, and the emulsion is added thereto at a later time. During the heating and mixing step previously referred to the powdered asphalt fluxes with the emulsion and produces a resulting asphalt having the desired penetration and stability.

Ordinary asphalt as well as coal-tar pipeline coatings become quite brittle at low temperatures. These materials also shrink and crack at lower temperatures. Such characteristics are extremely undesirable and largely account for the failure and rapid deterioration of previous coatings. It has been found that the presence of a small amount of rubber in the composition tends to counteract those disadvantages and to eliminate the susceptibility of the coating material to temperature changes. The rubber may be of any desired form or composition but applicant has found a highly satisfactory rubber for this purpose. There is available commercially a synthetic rubber in substantially powdered form, which is made by coprecipitation of synthetic rubber latex and extremely small particles of barium sulfate. The rubber is so minutely dispersed and separated by the particles of barium sulfate that it readily amalgamates with asphalt by either heat or friction, or a combination of both. This material contains about 25% unvulcanized synthetic rubber and 75% barium sulfate by weight.

It was also found that attempts to add the rubber to the emulsified asphalt resulted in a premature breaking of the emulsion and the rubberized asphalt was vulcanized or otherwise affected in the heating process which caused the mixture to set up or harden when not applied immediately to the pipe. Applicant has discovered a manner of mixing the material so that the hot mixture may be stored for a period of days while retaining the necessary extrudability. To accomplish this end, the powdered material is added to the dry mixed aggregates and thoroughly mixed therewith before the emulsion is added. It has also been found advantageous to mix the hard powdered asphalt with the rubber before adding them to the aggregate mixture. It was further found that the rubber particles as well as the powdered asphalt tended to form lumps rather than disperse freely and uniformly throughout the dry aggregate. Applicant has developed a method for handling the rubber and asphalt comprising mixing the powdered rubber and the powdered asphalt with fines from the aggregate mixture, the weight of the fines being 50% greater than the combined weight of the rubber and the asphalt. The fines added to the rubber and asphalt result in a mixture that is free-flowing and exhibits no tendency to lump or ball up while being handled and/or mixed with the aggregate. The rubber and asphalt are, therefore, preferably first thoroughly mixed with the proper quantity of the aggregate fines in a paddle or similar type mixer and then pulverized by passing the mixture through a hammer mill or equivalent apparatus which breaks up the small lumps and minutely disperses and separates the fine particles of the rubber and asphalt within the aggregate fines of the mixture.

When pipe is coated on the lay barge, it forms an integral part of the welding and laying operations which are subject to frequent and unforseeable delays. Accordingly, an insulated and heat-jacketed hopper must be used for storing an adequate quantity of the hot mixture so that work can be resumed promptly and commenced without delay in the mornings when the crews arrive aboard. A delay of several days due to weather is not infrequent when working offshore. On the other hand, when pipe is yard-coated, it is an independent and continuous operation which requires only a surge hopper for temporary storage of the mixture not exceeding one hour in duration. As the primary function of the rubber is to reduce the sensitivity of the coating mixture to temperature variations, less rubber is required when the pipe is barge-coated and laid immediately thereafter under water where temperature variations are considerably less than when the same pipe is yard-coated, stored, transported and handled in the hot sun and cold nights. It was found that the final hot mixture could be stored for several days in insulated and heat-jacketed hoppers on the lay barge without undue stiffening when the rubber content does not exceed about 2% of the weight of the asphalt and that this amount of rubber was adequate to overcome brittleness and softening of the mixture within the smaller temperature variations encountered in water. For the wider temperature ranges experienced in yard-coating, a rubber content of as much as 3% of the weight of the asphalt may be required to overcome brittleness and undue softness of the coating material and this mixture can be readily extruded as prolonged storage is not required when pipe is yard-coated.

The rubberized asphalt binder has proven to be highly advantageous in increasing the effectiveness of the pipe coating and has eliminated, within practical limits, the inherent disadvantages of the ordinary asphalt or coal-tar pipe coatings. Among the principal advantages resulting from rubberizing the pipe coating composition are:

The primary cause of failure with age of thin asphalt or coal-tar corrosion protection coatings is due to a breakdown of the electrical resistivity caused by the absorption of water. The absorption of water is due largely to the ionizable salts contained in the crudes from which the asphalt is refined. It is for this reason that the preferred asphalt is one that has been refined to reduce the ionizable salt content to 50 lbs. or less per thousand barrels, as previously indicated. Rubberizing the asphalt further assures waterproofing of the binder and effective electrical resistance of indefinite duration.

Laboratory tests show that the electrical resistance of the rubberized asphalt is twice that of an ordinary coal tar of the same thickness and that the dissipation factor, which indicates the deterioration with time of the electrical resistance, is only one-fourth that of coal tar. The rubberized asphalt compares favorably with commonly used insulating materials, with the possible exception of chlorinated rubber. It greatly exceeds vinyl and it is more effective than hard rubber.

Brittleness and checking or cracking which are characteristic of coal tar and ordinary asphalt coatings are eliminated within practical limits by rubberizing the asphalt. For instance, the ductility of an 80 penetration asphalt is zero at 32° F. but when rubberized it becomes 150+ (cms.) at 32° F. or about the equivalent of the untreated material at 77° F.

Not only is the ductility greatly increased at low temperatures by rubberizing the asphalt, but its stability at high temperatures is likewise increased due to a higher softening point. The softening point of an asphalt can be raised about 30° F. by the addition of a small percentage of rubber. Hence, when exposed to a tropical sun or when the pipe carries hot gases or liquids, adequate stability can be provided by using the proper amount of rubber together with a low penetration asphalt. The addition of rubber, therefore, lowers the susceptibility to temperature changes found in ordinary asphalts and coal tars.

One of the most marked effects of rubberizing the asphalt is the greatly increased adhesiveness and penetrating qualities of the material. The rubberized binder adheres firmly to the aggregates and eliminates stripping, a common cause of failure when ordinary asphalt mixtures are improperly designed for exposure to water.

The rubberized binder has been found to provide a better bond when the coating is applied directly to bare pipe than when a primer is used. In fact, it has been found that a primer developed especially for use with the asphalt coating compositions of this invention created a plane of weakness between the pipe and the rubberized coating. Therefore, with the rubberized coating the pipe need only be flame-dried and properly cleaned before the coating is applied. A better bond and more effective penetration of the metal results when the coating is applied to a warm pipe.

The use of weight-coated pipe for the purposes specified may be desired in many different locations and under different conditions, necessitating a coated pipe having an overall specific gravity that, in general, may be anywhere from 1.10 to 1.50. Obviously such results may readily be accomplished with a coating material of uniform weight by regulating the thickness of the coating on any particular pipe. However, since the specific gravity necessary for any specified pipe size may be generally anywhere between 1.10 and 1.50 and since the wall thickness or weight of the pipe itself may vary within wide limits, the size of nozzle on the extruding machine and other equipment required to produce the necessary coating weight could have to be varied accordingly. It would be highly uneconomical to have to provide different equipment for each wall thickness as well as for each different value of specific gravity that may be desired for each size pipe. It is, therefore, contemplated that the coating thickness for all pipes of the same diameter be the same and that the required specific gravity of the coated pipe be attained by adjusting the composition of the coating to the weight of the pipe and to the desired thickness of the coating. Many advantages result from such a method. First, the different sizes of physical apparatus necessary are reduced to no more than one size for each size of pipe. Secondly, the coating machinery generally operates at a substantially fixed rate whereby a predetermined length of pipe may be coated in one day, irrespective of the size of pipe or thickness of the coating. By employing a single coating thickness for all pipes of the same diameter, applicant is enabled to transport, for instance, in a single load and with the same size of hoppers, the right quantities of material to maintain operation of the coating apparatus for one day since the volume of materials so required will be the same for any given sized pipe, regardless of the required specific gravity of the coated pipe and regardless of the wall thickness or weight of the pipe.

Although a coating ⅜" in thickness would provide adequate corrosion protection and be more effective than a double coated and double wrapped coal-tar coating, this minimum thickness could not be maintained under the external loads to which a pipe line is subjected. Instantaneous loads on the coated pipe cause little, if any, deformation of the plastic coating. Sustained concentrated loads, however, such as stumps, roots or other hard objects on which a pipe line might rest, displace the coating material, thereby increasing the surface of contact and reducing the thickness and unit pressure until equilibrium is reached. The cold flow characteristic of the plastic material, therefore, necessitates a sufficiently thick coating to permit deformation under maximum load without reducing the thickness beyond that required for adequate corrosion protection. Furthermore, the optimum thickness for a pipe of given size must be such that the required density of the coating will not exceed 230 lbs./cu. ft. for the maximum specific gravity of the coated pipe of lightest weight customarily used in the given size. By much research, tests and calculations, applicant has found that the optimum coating thickness for a 12¾" outside diameter pipe is 1" and that the deformation of the coating under maximum load will not exceed one-half that thickness. Applicant has also found that the optimum thickness of coating for various standard size pipes may be adopted as follows:

| Pipe size, outside diam., inches | 8⅝ | 10¾ | 12¾ | 16 | 20 | 24 | 30 |
|---|---|---|---|---|---|---|---|
| Optimum Coating Thickness, inches | ¾ | ⅞ | 1 | 1⅜ | 1¾ | 2 | 2⅝ |

By adopting the standard coating thicknesses tabulated above it has been found that the pipes of the sizes noted may be rendered sufficiently heavy to sink and remain stabilized in even the most buoyant waters by employing the coating composition of this invention. For example, an 8⅝"x¼" pipe, in environments where a specific gravity of 1.25 is specified, may be coated with a mixture having a specific gravity of 136 lbs. per cu. ft. On the other hand, where such a pipe needs a specific gravity of 1.4, the noted coating thickness must have a density of 172 lbs. per cu. ft. Higher density requirements exist when large size pipes as, for example, the 30"x½" pipe must be coated to a resultant specific gravity of 1.40, in which case the density of the coating must be 230 lbs. per cu. ft. Reference herein to the "specific gravity" of a pipe refers to the specific gravity of the entire volume occupied by an empty pipe with the coating thereon.

In view of the variable requirements for the density of the coating material, applicant has developed a method of adjusting the proportions of materials in the coating to provide a mixture having any desired density between 136 lbs. per cu. ft. and 230 lbs. per cu. ft.

Applicant has developed three basic compositions of heavy, medium, and light densities from which all intermediate densities may be compounded. The three basic mixes comprise the relative proportions of materials as specified in the tabulation herebelow:

|  | Heavy (230#/cu. ft.) | | Medium (208#/cu. ft.) | | Light (136#/cu. ft.) | |
|---|---|---|---|---|---|---|
|  | Percent | Weight | Percent | Weight | Percent | Weight |
| Asphalt | 6.75 | 15.53 | 6.75 | 14.04 | 11.00 | 14.96 |
| Barites | 82.62 | 190.03 | 84.85 | 176.49 | | |
| Silica Sand | | | | | 66.70 | 90.71 |
| Barite Fines | 10.00 | 23.00 | | | | |
| Powdered Limestone | | | 7.77 | 16.16 | 21.50 | 29.24 |
| Glass | 0.25 | 0.57 | 0.25 | 0.52 | 0.25 | 0.34 |
| Rubber-barite Compound | 0.38 | 0.87 | 0.38 | 0.79 | 0.55 | 0.75 |

It will be noted from the above tabulation that the medium mix is obtained by substituting limestone fines for barite fines in the heavy mix and the light mix is obtained from the medium mix by substituting sand for the barite aggregates. For the lighter mixes the barites are too heavy to get the specific gravity of the coating down to the permissible low values in coatings of the standard thicknesses described heretofore and, therefore, the barites are blended with the light-weight sand. The light, 136 lbs. per cu. ft., basic mix employs silica sand only as the course aggregate and powdered limestone as the fines. In the above tabulation the rubber is provided by including the rubber-barite compound in the indicated proportions. And since the compound is only 25% rubber, it will be obvious that rubber itself is present in the ratio of about 1½% of the weight of the asphalt since the compound weighs four times as much as the rubber contained therein. It will further be noted from the above tabulation that the percentage of asphalt in the coating is from about 6% to about 11%. The total asphalt content thus listed is made up from 65% to 85% emulsified asphalt and from 35% to 15% of powdered hard asphalt. The course aggregate, including the self-contained fines, is present in the ratio of 65% to 85% of the total mix. The added fines constitute from 10% to 22% of the composition, and 0.25% of the weight of the coating is glass fibers. The amount of glass fibers may be increased to a maximum of about 0.35%. Having the proportions of the three basic mixes available, the composition of any desired mix having a density anywhere from 136 to 230 lbs. per cu. ft. may be readily calculated.

Assume, for example, that a mix having a density of 150 lbs. per cu. ft. is desired. The following method may be employed to determine the proper proportions of the constituent materials:

The density of 150 lies between 136 and 208, that is, it is intermediate the medium and the light mixes tabulated above. Let $x$=the fractional part of the light mix required. Then, $1-x$=the fractional part of the medium mix required. Thus, $136x+208(1-x)=150$. Therefore, $x=.8055$ and $1-x=.1945$. Then, by multiplying the weight of each constituent part in one cubic foot of the medium mix by .1945 and by multiplying the weight of each constituent part in one cubic foot of the light mix by .8055 and adding the products, the total weight of each constituent may be determined for a mix resulting in a coating having a weight of 150 lbs. per cu. ft. The corresponding percent content of the various constituents may then be determined by dividing the weight of each constituent by 150. In like manner, the proportions of the various components may be determined to result in a mixture having a density of any value from 136 to 230 lbs. per cu. ft.

It should be emphasized that the basic mixes tabulated above are mixtures initially "graded to maximum density" and then increased by the necessary additional fines and asphalt to render the mix readily extrudable, all as previously described herein.

The coating composition just described is used to produce a coated steel pipe which is a part of this invention. It comprises a pipe 1, shown in the drawings, which is the ordinary steel pipe of commerce used for laying pipelines for the transportation of natural gas and/or petroleum oil described earlier herein.

The numeral 3 designates a relatively thick layer of the bituminous mastic heretofore described. Its thickness as previously indicated depends primarily on the size of the pipe being coated since the larger the pipe the more buoyant it becomes and a greater weight and thickness of coating are necessary to cause the pipe to sink in water. The thickness and density of the coating should always be such that the coated pipe is not only heavy enough to sink but so heavy as to have a substantial negative buoyancy to cause it to remain stable on the bottom under all conditions or to sink below the bottom when and if the pipeline is buried below bottom by jetting.

Regardless of pipe size, however, the layer 3 will always be at least ¾ of an inch thick for fresh waters and in saline waters it should be at least ⅜ of an inch thicker than the maximum height of the barnacles existing in such waters to insure against penetration by those barnacles to a depth which might endanger the corrosion protection. The coating itself is susceptible to attack by barnacles but it has been found that they can never penetrate to a depth greater than the maximum height of the barnacle itself which, along the Texas-Louisiana coast, is ½ inch. Accordingly, pipelines laid in the saline waters along the Texas-Louisiana coast should have a minimum thickness of ⅞ inch, if not buried below bottom or wrapped as described below, to assure a remaining corrosion protection of ⅜ inch if the coating should be penetrated by barnacles. A coating thickness of ⅜ inch, as previously pointed out, provides a liberal factor of safety against corrosion. In Lake Maracaibo, Venezuela, the concrete as well as the corrosion protection coatings are penetrated by the teredo. To minimize corrosion failures in those waters, the concrete coated lines must be buried below bottom by jetting. In recent years the teredo has been found to have penetrated certain concrete coated lines off the Texas-Louisiana shore where it is now becoming the practice to bury concrete coated lines below bottom. When buried, a pipeline is protected from attack by barnacles as well as by teredoes. However, there is no assurance that a line will remain buried, especially within the surf zone, where depths are constantly changing due to littoral currents and wave action. Applicant has found after several years of investigation that a closely woven fiber glass mesh, similar to those used to protect the wooden hulls of boats from penetration by the teredo or other marine organisms, will afford equal protection to the coatings of this invention when used as the outer wrap 4 in the drawings. The cost for recently burying a concrete coated 10¾ inch pipeline below bottom in 50 ft. of water off the Louisiana shore was $2.00 per lineal foot. Had the coating of this invention been used and wrapped with the closely woven fiber glass mesh, it would not have been necessary to bury the pipeline and a positive protection against damage by marine organisms could have been obtained at an increase cost of only 8 cents per lineal foot instead of $2.00 per lineal foot required to bury the concrete coated line. The 8 cents represents the additional cost per lineal foot of 10¾ inch pipe to wrap the coating with the closely woven mesh instead of the open weave and cheaper mesh ordinarily used as described below.

To provide additional assurance against hot flow or tendency of the coating 3 to sag after it is applied to the pipe and while still hot and in a plastic state, the coating 3 is continuously wrapped under tension with a strip 4 of a strong fabric as it emerges from the extrusion nozzle. The edges of the fabric are sufficiently overlapped to prevent bulging of the hot material between adjacent convolutions. A woven glass fabric having 20 longitudinal strands to the inch and 10 transverse strands per inch has been found particularly suitable. This outer wrap embeds itself into the outer surface of the coating and secures the material in place until it hardens. Thereafter, it provides a strong external reinforcement for the coating and greatly increases the resistance to abrasion and impact against the outer surface of the coated pipe. If the optimum thickness of the coating does not exceed the maximum height of the barnacle in saline waters by at least ⅜ inch, as would be the case for an optimum thickness of ¾ inch on the 8⅝ inch pipe along the Texas-Louisiana coast, an outer wrap of the closely woven mesh would be required. It would also be less costly to use the more expensive type of outer wrap than to increase the optimum thickness which would necessitate special equipment as well as increased hopper and storage capacities. The closely woven outer mesh is available commercially in several weights so that lighter weight wraps can be used with smaller size pipes and the heavier weight wraps with the larger size pipes.

In preparing the coated pipe of this invention, the surface of the steel pipe is preferably first flame dried and must be cleaned of all loose scale and rust.

The method of extruding the coating layer 3 is not critical in the practice of the present invention, but one particularly advantageous method and apparatus therefor is disclosed in the copending application of Patrick H. Timothy and Clarence W. Shaw, Serial No. 492,931, filed March 8, 1955, and entitled, "Pipe Coating Method and Apparatus." In the method described in said application, however, the maximum compaction of the coating material occurs after the bituminous mastic layer 3 leaves the nozzle of the apparatus of said application and after it is wrapped by the glass mesh 4. This compaction is applied against the outer surface of the coating material while still plastic but at a sufficiently low temperature to assure the condensation of entrapped asphalt vapors. The compaction and bonding of the asphalt mastic against the pipe wall is performed in said application by external forces which may be produced by a repeated kneading action or by repeated impacts or vibrations. The applicant has subsequently found that more effective compaction and bonding to the pipe wall can be effected by vibrating the asphalt mastic while subjected to the high pressures occurring within the extrusion or molding chamber and nozzle of the apparatus of said application. This vibration is produced by means of external vibrators attached to the spring-supported assembly consisting of the molding chamber, pumps and hoppers feeding directly thereto. It has been found that the extrusion temperature, though somewhat higher than the temperatures at which the material was previously compacted and bonded against the pipe, is still sufficiently low to assure condensation of the entrapped asphalt vapors and to assure that the asphalt itself is sufficiently gelled and sufficiently adhesive to secure the aggregate particles when compacted. This latter requirement is greatly augmented, as previously discussed, by the use of the rubberized asphalt binder, which more firmly grips the mineral particles of the aggregates as they are compacted within the said apparatus. It has been previously pointed out that a more effective bond to the pipe wall is secured when the rubberized asphalt material is applied directly against the previously cleaned wall of the pipe itself within the molding chamber of the said apparatus. It has been further pointed out that the penetration of the rubberized material within the pores of the outer pipe wall is more effective when the pipe is warm. A better bond is also secured when the material is compacted against the pipe wall upon first contact with the pipe in the extrusion chamber than after extrusion about the pipe when the temperature of the material against the pipe wall is lower and, therefore, less penetrating. This compaction within the molding chamber also assures a more intimate contact between the rubberized plastic material and the pipe wall due to the fact that the vibration of the aforementioned assembly of said apparatus is also transmitted to the pipe itself. The vibration of the pipe wall within the molding chamber as well as that of the rubberized plastic material surrounding the pipe has a "screed" effect on the coating material adjacent to the wall of the pipe which displaces the larger particles and brings the more fluid material consisting of the fines and rubberized binder into contact with the wall of the pipe.

FIG. 3 is a diagrammatic flow sheet illustrating the preferred steps in preparing the mixtures of ingredients in carrying out the present invention. The dotted line boxes of FIG. 3 represent different portions of the equipment contemplated. For example, the dry mix plant is preferably a shore installation at a fixed site near transportation facilities. The box labeled "transport barge"

represents a barge or other vehicle for transporting the ingredients of the coating from the dry mix plant to the changeable location at which the coating is being applied to the pipe and the pipe is being laid in a canal or at an offshore location.

Referring now to the dry mix plant, the boxes 5 represent storage facilities for the aggregate material. Preferably the fines, the barium sulfate graded aggregate, and silica sand are kept in separate bins since they must be individually proportioned in whatever mix is being compounded. The box labeled "fines" may contain barium sulfate fines or powdered limestone, or may even constitute two separate bins for those different fines, respectively, for cases where both types of fines are employed in the same mix. Numeral 6 may be an endless conveyor upon which the desired proportions of the aggregate materials are deposited. The aggregate materials are first screened to remove excessively large particles and foreign matter and then metered and fed at the desired respective rates onto the conveyor 6 and delivered thereby to a bin 7 on the transport barge. As clearly indicated in FIG. 3, the rubber 8, powdered asphalt 9 and the fines 10, are separately measured, mixed and passed through mixer 11 from which they are delivered to the conveyor 6 along with the aggregate materials thereon to also be delivered to the bin 7 on the transport barge. It will be recalled that previous description indicated the proportions of fines to be included in the basic or intermediate mixes described. The fines 10 of FIG. 3 constitute a portion of the required total fines in the final composition and, in effect, are merely temporarily diverted from the supply of fines on the aggregate side of the mixing plant.

The transport barge includes a storage bin 7 for the dry mix materials and a tank or the like 12 for the asphalt-in-water emulsion. Preferably the bin 7 and the tank 12 are of such relative sizes that they hold the required proportionate quantities of dry mix and emulsion required for the particular coating composition being applied to the pipe. Preferably also, the bin 7 and tank 12 are of sufficient capacity to supply the pipe coating and laying apparatus with enough coating material to last through a predetermined length of time, for instance, one day. Thus, it is only necessary to make one trip per day with the transport barge to keep the coating apparatus in continuous operation. The rate of mixing the constituents at the dry mix plant may also be regulated to prepare one day's supply of materials in a single shift.

When the transport barge reaches the location of the pipe coating and laying apparatus, the dry mix from bin 7 and the emulsion from tank 12 may be transferred to separate storage facilities on the pipe coating and laying barge 13, or they may both be placed directly in the mixing and heating apparatus 14. As previously described, the mixing and heating apparatus thoroughly intermixes the dry mix and emulsion and heats the mixture to evaporate all of the water of the emulsion and to heat the asphalt to the proper temperature whereby the composition may be readily extruded on the pipe 15 by a suitable pipe coating machine 16. It has been found convenient to introduce the glass fibers into the composition on the barge 13 rather than at the dry mix plant. The box 17 represents apparatus for unreeling the glass fiber yarn and chopping the same into ¼-inch lengths at the proper rate to provide the desired proportion of glass fibers in the composition.

Thus by the present invention, I have provided in a single operation a heavyweight anti-corrosion coated pipe which can be laid in waters exposed to wave action and in depths greatly exceeding those of the coated and weighted pipes of the prior art, and a method of economically making and handling the coating material. A concrete coated pipe cannot be laid in depths in excess of 12 to 18 feet by any presently known method without danger of destroying the coating due to wave action. The coated pipes of this invention can be laid in any waters, regardless of depth and normal wave action.

The description herein is illustrative of a preferred form of the invention and it is contemplated that the invention encompass other modifications and/or equivalents within the scope of the appended claims.

I claim:

1. As a pipe coating composition, an extrudable bituminous mastic comprising a mixture of a major proportion of a non-micaceous mineral aggregate having large particles of predetermined maximum size, intermediate sized particles and having some particles passing a 200-mesh screen and graded to maximum density, a minor proportion of additional fine non-micaceous mineral material ground to pass a 200-mesh screen, and a flexible asphalt binder material only slightly but not materially in excess of the quantity necessary to fill the voids in said aggregate and additional fine material so as to completely coat all of the particles thereof, said additional fine material being present in sufficient quantity to render said composition readily extrudable.

2. A composition as defined in claim 1, including glass fibers in an amount not exceeding about 0.35% of the weight of said mastic.

3. A composition as defined in claim 1, including rubber in the amount of from 1% to 3% of the weight of said asphalt.

4. A composition as defined in claim 1, wherein said mineral aggregate is selected from the group consisting of ilmenite and barium sulfate.

5. A composition as defined in claim 1, wherein said additional fine material is selected from the group consisting of barium sulfate and powdered limestone.

6. A composition as defined in claim 1, wherein said asphalt comprises from about 6% to about 11% of the weight of said mastic.

References Cited in the file of this patent

UNITED STATES PATENTS

| | | |
|---|---|---|
| Re. 16,821 | Levy | Dec. 20, 1927 |
| 1,565,258 | Cobb | Dec. 15, 1925 |
| 1,596,232 | Black | Aug. 17, 1926 |
| 1,887,979 | Levin | Nov. 15, 1932 |
| 1,984,649 | McDonald et al. | Dec. 18, 1934 |
| 2,135,208 | Bray et al. | Nov. 1, 1938 |
| 2,148,510 | Simison | Feb. 28, 1939 |
| 2,584,919 | Pullar | Feb. 5, 1952 |
| 2,749,250 | Christensen et al. | June 5, 1956 |

FOREIGN PATENTS

| | | |
|---|---|---|
| 15,500 | Great Britain | Oct. 21, 1893 |